July 23, 1968 T. D. LODE 3,393,561
AIRCRAFT PERFORMANCE MEASUREMENT MEANS
Filed July 29, 1965 2 Sheets-Sheet 1

INVENTOR
TENNY D. LODE

INVENTOR
TENNY D. LODE

United States Patent Office 3,393,561
Patented July 23, 1968

3,393,561
AIRCRAFT PERFORMANCE MEASUREMENT MEANS
Tenny D. Lode, Madison, Wis., assignor to Rosemount Engineering Company, Minneapolis, Minn., a corporation of Minnesota
Filed July 29, 1965, Ser. No. 475,769
9 Claims. (Cl. 73—180)

ABSTRACT OF THE DISCLOSURE

The response of an aircraft to changes in angle of attack is measured in terms of the average direction of total motion variations due to lift and drag accelerations caused by the angle of attack changes. This measurement may be related to angle of attack or some other performance parameter. Flight perturbations causing changes in angle of attack may be those naturally occurring as vertical components of turbulent air or may be induced by perturbing a control surface.

---

This invention relates to the measurement of aircraft performance characteristics and parameters in flight. More particularly, it relates to the in flight measurement of quantities such as the lifting effectiveness of a wing and the extent to which it is approaching a stall by sensing the response of an aircraft to air turbulence and/or other disturbances.

The magnitude of the aerodynamic lift generated by an airfoil is usually expressed as $$L = C_L S Q$$

where $C_L$ is the lift coefficient, a dimensionless number which is a function of the angle of attack, S is the wing area and Q is the dynamic pressure. The dynamic pressure is given by $$Q = \tfrac{1}{2} \rho V^2$$

where $\rho$ is the air density and V is the velocity of the relative wind. Similarly the drag may be expressed as $$D = C_D S Q$$

where $C_D$ is the drag coefficient.

For low and moderate subsonic velocities the lift and drag coefficients are functions of the airfoil configuration and the angle of attack. For a particular airfoil, they may be regarded essentially as functions of only the angle of attack. For a simple, long span airfoil the lift coefficient may be expected to increase almost linearly to a maximum of approximately 1.5. For typical airfoils, this maximum lift coefficient will be reached at an angle of attack of approximately 20°. As the angle of attack increases beyond the maximum lift value, the lift coefficient falls rapidly. The drag coefficient of a simple subsonic airfoil may be expected to increase approximately as a constant plus the square of the angle of attack. The ratio of the lift coefficient to the drag coefficient, a measure of airfoil efficiency, is greatest for an angle of attack of approximately 5°. Short span wings, delta wings, swept wings and airfoil shapes which are often chosen for their advantages in high speed flight are relatively less efficient in low speed flight. The lift coefficient for short span delta and/or swept back wings generally increases less rapidly with increasing angle of attack and does not reach as high a maximum value as the simple long span subsonic wing. Maximum lift to drag ratios for actual aircraft may range from 5 for a supersonic aircraft in subsonic flight to 30 or more for a high performance sailplane or glider.

Aircraft are usually designed so that they will operate near their maximum lift to drag ratio in cruising flight. At lower air speeds the wing must operate at a greater angle of attack to generate the required lift at the reduced dynamic pressure. As the airspeed is reduced, level flight may be maintained by increasing the angle of attack and corresponding lift coefficient until the maximum value of the lift coefficient is passed and the aircraft stalls. In landing, it is desirable to operate at as low a speed and as high a lift coefficient as is consistent with safety. Landing approaches are usually flown at a predetermined air speed or angle of attack. In addition, various stall warning devices which measure angle of attack, airflow over the wing or other quantities may be employed to warn of the approach to a stall.

A disadvantage of many types of conventional stall warning indicators is that they require external movable vanes and/or external air pressure sensing ports whose operation may be adversely affected by icing or other external conditions.

A further disadvantage of conventional stall warning techniques is that an aircraft may not always stall at precisely the same air speed or angle of attack. Variations in aircraft gross weight will change the stalling speed but not the stalling angle of attack. Different flap settings, changes in external stores attached to the aircraft, damage and/or icing may change both the stalling speed and the stalling angle of attack. Changes in the performance of boundary layer control systems and other high lift systems, if employed, may also affect both the stalling air speed and the stalling angle of attack. More precise measurement of the extent to which an individual aircraft is actually approaching a stalling condition would allow landing approaches and other flight operations to be safely conducted at lower air speeds.

An object of this invention is to measure in flight the actual aerodynamic lift and drag performance characteristics of an aircraft and the extent to which it may be approaching a stall. Other objects include the measurement of an approach to a stall without requiring the use of external movable vanes or air pressure sensing ports, the measurement of the lift and drag characteristics of both fixed and rotary wing aircraft for cruise control, measurement of the basic flight characteristics of the aircraft and other flight operations as desired.

In a particular form of the invention, an aircraft is assumed to be in flight through air of slight turbulence. At moderate angles of attack, near the maximum lift to drag ratio, transient changes in lift due to air turbulence will be accompanied by relatively small changes in total drag. At higher angles of attack a transient increase in lift due to air turbulence will be accompanied by a greater transient increase in drag. The lift and drag accelerations are measured by inertial accelerometers mounted in the aircraft. The angle of attack or other desired performance parameter is determined from measurements of the relative magnitudes of the transient lift and drag accelerations due to air turbulence.

Figure 5:
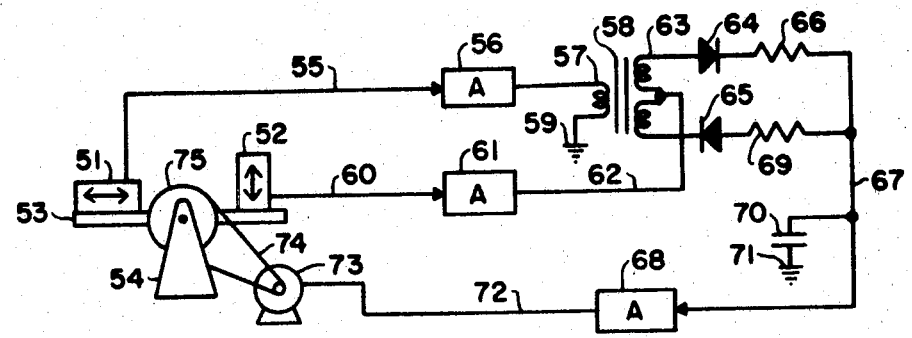
Figure 6:
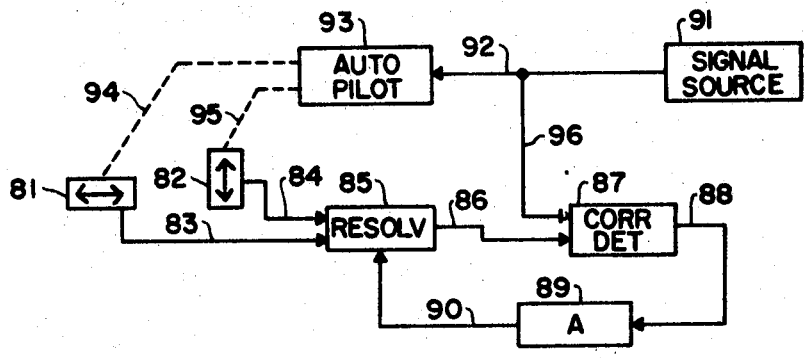

FIGURE 5 is an electrical circuit diagram illustrating a second form of the invention employing two accelerometers placed on a rotatable platform with a feedback control system to rotate said platform so that it will be perpendicular to the direction of the average sensed accelerations; and FIGURE 6 is a block diagram illustrating a third form of the invention in which a sine-cosine resolver is used in place of the rotatable platform of FIGURE 5 and in which a perturbation signal source is used to introduce deviations in the aircraft flight path.

Figure 1:
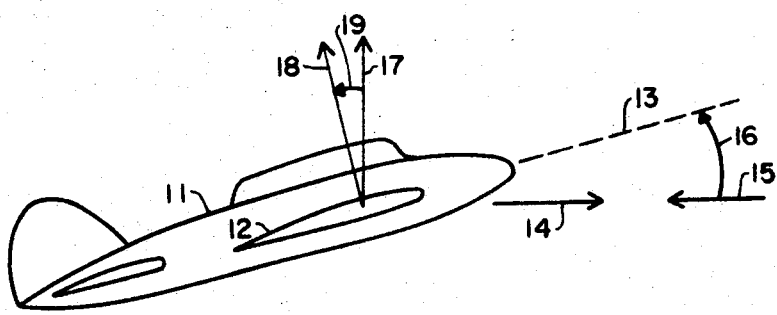
FIGURE 1 is a pictorial illustration of an aircraft in horizontal flight with various directions and angles indicated for convenience in describing the principles of the invention.

Reference is now made to FIGURE 1 which includes aircraft 11 with wing 12. The chord line of wing 12 is designated by dotted line 13. Aircraft 11 is assumed to be in horizontal flight as indicated by flight direction vector 14. In still air, the relative wind as seen by aircraft 11 will be opposite flight direction 14 and as indicated by relative wind vector 15. The angle of attack 16 is the angle between relative wind vector 15 and chord line 13. The gravitational vertical is indicated by vector 17, and the normal to chord line 13 is indicated by vector 18. For horizontal flight through still air, angle 19 between vectors 17 and 18 will be equal to angle of attack 16.

Figure 2:
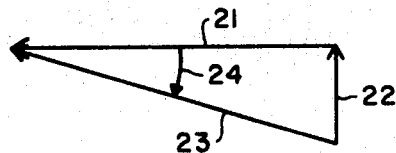
FIGURE 2 is a vector diagram illustrating the effect of the superposition of a vertical air current upon the relative wind encountered by the aircraft of FIGURE 1.
Figure 3:
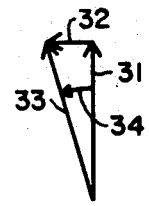
FIGURE 3 is a vector diagram illustrating the total translational acceleration of the aircraft of FIGURE 1 due to lift and drag acceleration components.

FIGURE 2 illustrates the effect of a vertical air current upon relative wind 15 of FIGURE 1. In FIGURE 2, the still air relative wind seen by the aircraft in horizontal flight is indicated by vector 21. Vector 22 represents a moderate upward vertical air current. The resultant relative wind 23 will be a vector sum of wind components 21 and 22. For small values of vertical air velocity, vectors 21 and 23 will be of nearly the same length and the major apparent effect of the vertical air current will be to rotate the direction of the relative wind through angle 24. Thus, when aircraft 11 flies through a vertical upward air current, its angle of attack will be momentarily increased by angle 24, the apparent change in the direction of the relative wind. This increase in angle of attack will cause an increase in both lift and drag. The momentary lift acceleration due to such an angle of attack change is indicated by vector 31 of FIGURE 3. The corresponding increase in drag is indicated by vector 32. The momentary total acceleration 33 of aircraft 11 will be the vector sum of lift and drag accelerations 31 and 32. Thus, the result of aircraft 11 encountering a momentary vertical air current while in horizontal flight will be a momentary acceleration in a direction which is generally upward but behind the gravitational vertical by angle 34. Equipment for measuring the direction or axis of this acceleration vector will be described later in this specification.

As aircraft 11 flies through turbulent air and/or its control surfaces are moved, aircraft 11 will experience a series of positive and negative accelerations generally along an axis which is tilted back somewhat from gravitational vertical 19. The angle of this perturbation acceleration axis may be measured and will be a useful indication of the flight characteristics of aircraft 11. The angle of the perturbation acceleration axis may be measured either with respect to gravitational vertical 17 or with respect to an aircraft coordinate such as normal 18 to chord line 13. When aircraft 11 is in cruising flight at a moderate angle of attack and the wing operating with high efficiency, the magnitude of the lift component of the total perturbation acceleration will be significantly greater than the drag component. The average perturbation acceleration axis will then be near the vertical or normal to the chord line. At low air speeds and/or high angles of attack where the wing is relatively inefficient, changes in lift will be accompanied by much larger relative changes in drag. The average axis of the perturbation accelerations will then be rotated more towards the rear of the aircraft. At the "edge" of a stall, the response to a small increase in angle of attack would be an increase in drag only, so that the average perturbation acceleration axis will have rotated back to approximately parallel to the direction of flight.

Thus, the measurement of the direction of the axis of accelerations due to air turbulence and/or other disturbances such as control surface motions offers a means for determining the performance characteristics of an aircraft in flight. In particular, measurement of this angle may be used as an indication of proper speed for a landing approach.

Figure 4:
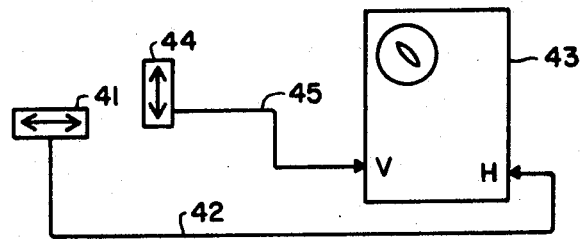
FIGURE 4 is a block diagram illustrating a first form of the invention in which the outputs of two accelerometers are displayed on an electronic oscilloscope.

Reference is now made to FIGURE 4 which illustrates a simple instrumentation system for the measurement of the average turbulence acceleration axis. In FIGURE 4, accelerometer 41 is connected via line 42 to a horizontal input of oscilloscope 43. Accelerometer 44 is similarly connected via line 45 to a vertical input of oscilloscope 43.

Accelerometers 41 and 45 are single axis, linear accelerometers mounted on a aircraft to sense accelerations along the longitudinal and vertical axes of the aircraft. The outputs of these accelerometers are connected to oscilloscope 43. In practice, depending on the signal output level of accelerometers 41 and 44, the sensitivity of oscilloscope 43, and their frequency reponses and dynamic characteristics, amplifiers and/or filters may be required as coupling devices. In operation, a vertical acceleration will be sensed by accelerometer 44 and will show up as a vertical line on the screen of oscilloscope 43. Similarly, a horizontal acceleration will appear as a horizontal line on the screen of oscilloscope 43 and a diagonal acceleration as a diagonal line. Hence, by observing the pattern on the screen of oscilloscope 43, the predominant axis of turbulence accelerations may be noted.

A system generally resembling that shown in FIGURE 4 was installed resembling that shown in FIGURE 4 was installed in a Cessna 310 type aircraft for flight evaluation. A number of test flights were made at altitudes up to 6000 feet above the ground. These test flights were conducted in southern Minnesota where the ground elevation is approximately 1000 feet above sea level. The air turbulence was that normally encountered in good weather due to the uneven solar heating of land and lake masses during daylight hours and moderate winds across low rolling hills. In a particular test flight, the gain of the horizontal channel corresponding to accelerometer 41 and line 42 was approximately 8 times the gain of the vertical channel corresponding to accelerometer 44 and line 45. At a moderate cruising speed of 170 m.p.h. (indicated air speed) the turbulence acceleration pattern displayed on the oscilloscope screen was primarily along an axis approximately 40° from the horizontal axis of the oscilloscope. The aircraft was then flown at 85 m.p.h. (indicated air speed) and the average turbulence acceleration axis observed on the oscilloscope screen was then 15° from the horizontal. The slow speed flight was approximately 5 to 10 m.p.h. above the stalling speed of the aircraft under the particular flight conditions of low engine power settings and landing gear and flaps retracted. The direction of the average turbulence acceleration axis displayed on the screen of oscilloscope 43 rotated approximately 25° between normal cruising flight and low speed flight. This demonstrated that a system of the type illustrated in FIGURE 4 can measure the approach to a stall of an aircraft in flight without the use of external sensors.

Reference is now made to FIGURE 5 which illustrates a second form of the invention which measures the average axis of turbulence accelerations without requiring visual observation and judgement as with the system of FIGURE 4. In FIGURE 5, accelerometers 51 and 52 are mounted on rotatable platform 53 which is supported by base 54. Accelerometer 51 connects via line 55 to amplifier 56. The output of amplifier 56 connects to a first side of primary winding 57 of transformer 58. The second side of primary winding 57 connects to ground 59. Accelerometer 52 connects via line 60 to the input of amplifier 61. The output of amplifier 61 connects via line 62 to the center tap of secondary winding 63 of transformer 58. A first end of secondary winding 63 connects to the anode of diode 64. The second end of secondary winding 63 connects to the cathode of diode 65. The cathode of diode 64 connects through resistor 66 to line 67 and the input of amplifier 68. The anode of diode 65 connects through resistor 69 to line 67. Capacitor 70 connects from line 67 to ground 71. The output of amplifier 68 connects via line 72 to motor 73. Motor 73 is mechanically coupled via belt 74 to wheel 75. Wheel 75 is mechanically connected to platform 53 and serves to rotate it with respect to base 54. Platform 53 is assumed to be mounted in an aircraft, such as aircraft 11 of FIGURE 1, such that the rotation axis of platform 53 is parallel to the pitch axis of the aircraft.

Transformer 58, diodes 64 and 65, and resistors 66 and 69 form a phase sensitive rectifier of the type used in frequency and phase modulation radio receivers and in various types of control systems. If the electrical outputs of accelerometers 51 and 52 on lines 55 and 60 are predominantly in phase, the output on line 67 will be of predominantly one polarity. If the accelerometer outputs on lines 55 and 60 are of predominantly opposite phase, the electrical output on line 67 will be predominantly of the opposite polarity. Capacitor 70 serves as a filter to smooth or average the voltage on line 67. If accelerometer platform 53 is perpendicular to the average axis of the turbulence accelerations, these accelerations will be sensed by accelerometer 52 and essentially ignored by accelerometer 51. Under these conditions, the average output of the phase sensitive rectifier network on line 67 will be essentially zero. If platform 53 is not perpendicular to the average axis of the turbulence accelerations, they will be sensed by accelerometer 51. The accelerometer output signals on lines 55 and 60 will be either in phase or of opposite phase depending upon the angular position of platform 53 with respect to the average turbulence acceleration axis. The unbalanced signal on line 67 will then be amplified by amplifier 68 causing motor 73 to rotate platform 53 until it is again perpendicular to the average turbulence acceleration axis. The direction of the average axis of turbulence acceleration may be noted by measuring the angular position of platform 53. The measurement of the position of platform 53 may be with respect to a gravitational vertical, with respect to a local aircraft coordinate, or with respect to other coordinates as desired. As before, the condition of approaching a stall will be indicated by the direction of the measured average axis of turbulence accelerations rotating towards the rear of the aircraft.

Reference is now made to FIGURE 6 which illustrates a third form of the invention generally resembling the system of FIGURE 5 except that two fixed accelerometers and a variable sine-cosine resolver are employed instead of the movable platform of FIGURE 5, and for the use of deliberate perturbation of the aircraft flight path in addition to or in place of accelerations due to air turbulence. FIGURE 6 includes acclerometers 81 and 82 which are attached to the aircraft to measure longitudinal and vertical accelerations, respectively. The outputs of accelerometers 71 and 82 connect via lines 83 and 84 respectively to inputs of sine-cosine resolver 85. The output of resolver 85 connects via line 86 to a first input of correlation detector 87. The output of correlation detector 87 connects via line 88 to the input of amplifier 89. The output of amplifier 89 connects via line 90 to resolver 85. Signal source 91 connects via line 92 to the input of autopilot 93, and via line 96 to a second input of correlation detector 87. Since autopilot 93 controls motion of the aircraft in which the system of FIGURE 6 is installed, and since these motions will be sensed by accelerometers 81 and 82, autopilot 93 is effectively coupled to accelerometers 81 and 82, as indicated by links 94 and 95 respectively.

As mentioned previously, one difference in the system of FIGURE 6 is the use of resolver 85 to perform some of the functions of rotatable platform 53 of FIGURE 5. The output of resolver 85 on line 86 is of the form $(A \cos (\theta) + B \sin (\theta))$ where A is the output of accelerometer 82 on line 84, B is the output of accelerometer 81 on line 83, and $\theta$ is a particular angle. Resolvers of this type are known and in use in applications such as analog computing and control systems. One suitable form of resolver uses a sine-cosine potentiometer whose variable arm is rotated by an electric motor. In such a resolver, the angle $\theta$ is the angular position of the potentiometer wiper arm. If such a resolver were used for resolver 85, line 90 would connect to the electric motor therein.

Thus, although the particular mechanisms are different, accelerometers 81 and 82 in combination with resolver 85 generate an acceleration signal on line 86 which corresponds to the signal which would be obtained from a single accelerometer positioned at an angle $\theta$. The accelerometer and resolver combination of FIGURE 6 may be compared with the accelerometer and rotatable platform combination of FIGURE 5. The output of accelerometer 51 on line 55 corresponds to the signal on line 86 of FIGURE 6, and the motor control signal on line 72 of FIGURE 5 corresponds to the resolver control signal on line 90 of FIGURE 6. In the description of the operation of the system of FIGURE 6 it will be assumed that the resolver control signal on line 90 controls the rate of change of the resolver angle $\theta$. In some types of commercially available resolvers the control signal corresponds to the resolver angle rather than its rate of change. Resolvers of this type may be used for resolver 85 if an integrater or suitable filter is placed between the output of amplifier 89 and the control input to resolver 85.

A second difference of the system of FIGURE 6 is the use of signal source 91 and autopilot 93 to induce aircraft accelerations in addition to or in place of the previously described turbulence or air current accelerations. Autopilot 93 is assumed to be coupled to the pitch axis of the aircraft so that signals on line 92 will cause pitch up and pitch down motions. These pitching motions will vary the instantaneous angle of attack of the aircraft and cause lift and drag accelerations. The magnitudes of these accelerations will normally be quite small. As in the case of accelerations due to air currents, the perturbation accelerations will tend to be along an axis whose direction will depend upon the air speed and other flight characteristics of the aircraft. The output of signal source 91 on lines 92 and 96 may be of a random and/or periodic character.

If the angle $\theta$ within resolver 85 is effectively perpendicular to the average perturbation acceleration axis, the output of resolver 85 on line 86 will be essentially uncorrelated with respect to the perturbation accelerations of the aircraft and the signal on lines 92 and 96. The output of correlation detector 87 will then be essentially zero. If the angle $\theta$ within resolver 85 is not perpendicular to the average perturbation acceleration axis, the output on line 86 will have either a positive or a negative non-zero correlation with respect to signals on line 96. The output of correlation detector 87 on line 88 will then be of either positive or negative polarity. This output is supplied to amplifier 89 whose output on line 90 will adjust the angle $\theta$ within resolver 85 in a direction so as to reduce the correlation signal on line 88 and return the angle $\theta$ to essentially perpendicular to the average perturbation acceleration axis. The value of $\theta$ is then a measure of the direction of the average perturbation acceleration axis and of the aircraft flight characteristics.

Correlation detectors, such as correlation detector 87, are known and in use in various types of analog computing and control systems. Correlation detector 87 is of the type sometimes referred to as a cross-correlation detector. One type of cross-correlation detector which would be suitable for use as correlation detector 87 is a multiplying circuit followed by an averaging or smoothing filter. The voltage signals on lines 86 and 96 would be multiplied to form a product voltage signal which would in turn be filtered and provided as an output signal on line 88. A phase sensitive rectifier, such as shown in the system of FIGURE 5, may be used as a simple form of cross-correlation detector.

In some instances it will be sufficient to measure whether the actual average perturbation acceleration axis is more or less vertical than a particular specified angle. In such instances, the accelerometers in the system of FIGURE 5 may be mounted at particular fixed angles and the polarity of the output on line 87 taken as an indication of whether the average perturbation acceleration axis is more or less vertical than the angle implied by the mounting arrangement of the accelerometers. The system of FIGURE 6 may be similarly used with resolver 85 set at a fixed angle and the polarity of the output on line 88 taken as an indication of whether the average perturbation acceleration axis is more or less vertical than the angle implied by angle $\theta$ of resolver 85. If desired, the system of FIGURE 6 may then be simplified by replacing accelerometers 81 and 82 and resolver 85 by a single accelerometer. The single accelerometer would be connected to line 86 and arranged with its sensitive axis essentially perpendicular to the direction for which a zero correlation output is desired.

The drawings have shown certain specific combinations of equipment for the measurement of the response of an aircraft to turbulence and/or deliberate perturbation accelerations. Many combinations other than those specifically shown may be used within the spirit of this invention. For example, a system employing deliberate perturbation of an aircraft flight path such as by signal source 91 and autopilot 93 of FIGURE 6 may be used with a system which otherwise resembles that of FIGURE 5.

The preceding specification has described the use of accelerometers for the measurement of accelerations and the analysis of measured accelerations for the determination of aircraft performance characteristics. It was mentioned that filtering of the accelerometer signals may be desirable. It is known that filtering operations such as integration and differentiation with respect to time can be used to transform acceleration signals into related motion signals such as velocity, position and rate of change of acceleration. Similarly, acceleration and other related motion signals may be derived via suitable filtering of velocity, position or other motion signals.

The use of accelerometers in the present invention is a particular convenient manner of deriving the desired motion signals. Other forms of motion sensors, responsive to acceleration, velocity, position and/or other motion variables, with or without time domain, frequency domain and/or other filtering, may be used within the spirit of this invention.

Motion perturbations other than acceleration may be analyzed in place of or in addition to the analysis of acceleration signals within the spirit of this invention. As mentioned previously, a system generally similar to that of FIGURE 4 was used for a number of flight tests. For several test flights, amplifiers and filters were connected between the accelerometers and the oscilloscope so that the oscilloscope spot deflections corresponded to the momentary variations of aircraft velocity or position due to lift and drag acceleration variations.

In the claims, the term "disturbance" as applied to an aircraft in flight is intended to include disturbances due to flight through turbulent air and/or disturbances due to perturbations introduced by manipulation of the aircraft control surfaces or other control devices. The term "acceleration" is intended to imply both positive and negative accelerations and hence both accelerations and decelerations. The terms "motion" and "motion variation" are intended to include the meanings of acceleration, rate of change of acceleration, velocity and position values and variations.

What is claimed is:

1. In an aircraft having a pitch axis and a pitch plane, a measurement of performance of the aircraft relative to its pitch axis comprising subjecting the aircraft to angle of attack disturbances about its pitch axis and measuring an average direction of momentary aircraft accelerations in the pitch plane caused by the angle of attack disturbances as an indication of the angle of attack of the aircraft.

2. In aircraft flying through air and having a pitch axis and a pitch plane, a measurement of performance of the aircraft comprising subjecting the aircraft to angle of attack disturbances, measuring accelerations indicative of variations in lift due to the disturbances, simultaneously measuring accelerations indicative of variations in drag due to the disturbances, and comparing the acceleration measurements to define a ratio definitive of the average direction of aircraft motion variations in the pitch plane caused by the angle of attack disturbances.

3. The measurement of claim 2 wherein comparing the acceleration measurements comprises deriving an angle whose tangent is proportional to the ratio of average lift acceleration variations and average drag acceleration variations, and displaying the angle.

4. In an aircraft having an aircraft shell with a pitch axis and a pitch plane and being subjected to angle of attack disturbances, motion sensing means completely within the aircraft shell for measuring performance related to angle of attack of the aircraft comprising first means for measuring aircraft motions in the pitch plane due to the angle of attack disturbances, and second means responsive to the first means for defining the direction of the aircraft pitch axis motion variations in the pitch plane with respect to a reference axis.

5. In an aircraft having a pitch plane and subjected to angle of attack disturbances, apparatus for measurement of aircraft performance comprising accelerometer means including a rotatable platform, the accelerometer means giving signal outputs in response to motion along a pair of acceleration axes lying in the aircraft pitch plane, correlation means to combine the accelerometer outputs and supply a correlation signal, drive means controlled by the correlation signal to rotate the platform in a direction to reduce the correlation signal substantially to zero so that the platform angular position in the pitch plane is representative of an average direction of aircraft accelerations in the pitch plane due to the angle of attack disturbances.

6. In an aircraft having a pitch plane and a pitch axis and subjected to rotational variations about the pitch axis due to angle of attack disturbances, apparatus for measurement of aircraft performance comprising sensing means having a resultant sensing axis for detecting motions within the pitch plane and giving a motion signal representative of the motions, correlation means for comparing the motion signal to the angle of attack disturbances and giving a correlation signal representing the correlation between the motion signal and the angle of attack disturbances, and control means to vary the angular direction of the resultant sensing axis of the sensing means with respect to a reference axis in the pitch plane so that the correlation signal is reduced to zero and the resultant sensing axis direction is definitive of the average direction of aircraft motions in the pitch plane.

7. In an aircraft having a pitch plane, the combination of apparatus for measurement of aircraft performance comprising accelerometer means responsive along two axes aligned in the pitch plane to have outputs substantially responsive to accelerations due to lift and drag variations respectively, a resolver having an angle which is variable and having the accelerometer outputs as first and second input signals and having an output which is a function of the angle and the inputs signals, a signal source coupled to a aircraft pitch control surface for causing pitch variations, a cross correlation detector having the resolver outputs as a first detector input and having a second detector input connected to the signal source, and amplifier control means connected between the cross correlation detector and resolver to vary the resolver angle so that substantially zero correlation is maintained between the signal source and resolver output and the angle is representative of the direction of aircraft accelerations caused by the pitch variations.

8. In an aircraft having a pitch axis and a pitch plane, a measurement of performance of the aircraft comprising subjecting the aircraft to angle of attack disturbances, measuring accelerations along first and second orthogonal axes in the pitch plane, combining the acceleration measurements along one of the first and second axes with the measurements along the other of the first and second axes to achieve a correlational signal representative of the average direction of aircraft motion variations in the pitch plane, and determining the relationship of the correlation signal direction to a predetermined axis within the aircraft pitch plane.

9. In an aircraft having a pitch axis and a pitch plane, a measurement of performance of the aircraft comprising subjecting the aircraft to known angle of attack disturbances, measuring the resulting accelerations within the pitch plane, correlating the acceleration measurements with the known angle of attack disturbances, and resolving the correlated acceleration measurements to obtain an acceleration axis referenced to an axis within the aircraft pitch plane.

References Cited

UNITED STATES PATENTS

| | | | |
|---|---|---|---|
| 1,154,396 | 9/1915 | Hayot | 73—505 X |
| 2,128,169 | 8/1938 | Shanley | 177—311 |
| 2,182,706 | 12/1939 | Shanley | 177—311 |
| 2,461,210 | 2/1949 | Gray | 73—178 |
| 2,538,303 | 1/1951 | Findley | 73—178 |
| 2,613,071 | 10/1952 | Hansel | 261—1 |
| 3,140,605 | 7/1964 | Randolph | 73—178 |
| 3,069,906 | 12/1962 | Eiland | 73—180 |

DAVID SCHONBERG, *Primary Examiner.*

LOUIS R. PRINCE, *Examiner.*

NEIL B. SIEGEL, *Assistant Examiner.*